(12) United States Patent
Chen

(10) Patent No.: US 9,731,794 B1
(45) Date of Patent: Aug. 15, 2017

(54) STONE DUMPING REAL TIME MEASURING SYSTEM FOR STONE DUMPING VESSEL

(71) Applicant: Ship and Ocean Industries R&D Center, New Taipei (TW)

(72) Inventor: Lin-Fu Chen, New Taipei (TW)

(73) Assignee: SHIP AND OCEAN INDUSTRIES R&D CENTER, New Taipei (TW)

(*) Notice: Subject to any disclaimer, the term of this patent is extended or adjusted under 35 U.S.C. 154(b) by 0 days.

(21) Appl. No.: 15/401,556

(22) Filed: Jan. 9, 2017

(51) Int. Cl.
| | |
|---|---|
| *B63B 35/44* | (2006.01) |
| *B63B 27/16* | (2006.01) |
| *B63B 39/00* | (2006.01) |
| *G01S 15/08* | (2006.01) |
| *G01S 7/52* | (2006.01) |

(52) U.S. Cl.
CPC ............. *B63B 27/16* (2013.01); *B63B 35/44* (2013.01); *B63B 39/005* (2013.01); *G01S 15/08* (2013.01); *B63B 2211/02* (2013.01); *B63B 2213/02* (2013.01); *G01S 7/52004* (2013.01)

(58) Field of Classification Search
CPC ........ B63B 35/306; E02B 3/121; E02D 15/10
See application file for complete search history.

(56) References Cited

U.S. PATENT DOCUMENTS

| 5,775,836 A | * | 7/1998 | Dean, Jr. | ................. E02B 3/121 |
| | | | | 405/17 |
| 9,162,263 B2 | * | 10/2015 | Elia | ........................... B09C 1/00 |

* cited by examiner

*Primary Examiner* — Edwin Swinehart
(74) *Attorney, Agent, or Firm* — Ming Chow; Sinorica, LLC

(57) ABSTRACT

A stone dumping real time measuring system for a stone dumping vessel includes a boom. The boom is mounted to a control cabin of the stone dumping vessel and can extend outwardly from the control cabin to be located above a predetermined stone dumping position. A signal line hangs from the boom. A floater is connected to the other end of the signal line. The floater is provided with a positioning device, a surge compensator, and a depth sounder. The floater freely floats on the water through the separate design of the floater and the stone dumping vessel. The floater is directly positioned by the positioning device of the floater, and the surge compensator is able to correct a measurement error of the depth sounder to instantly report the stone dumping result and to improve the accuracy and precision of the stone real time measuring system.

5 Claims, 4 Drawing Sheets

STONE DUMPING REAL TIME MEASURING SYSTEM FOR STONE DUMPING VESSEL

FIELD OF THE INVENTION

The present invention relates to a measuring system, and more particularly to a stone dumping real time measuring system for a stone dumping vessel.

BACKGROUND OF THE INVENTION

A conventional stone dumping measuring system comprises a measuring frame. The measuring frame is placed in the water from the side of the hull to measure and report the stone dumping result when the stone dumping operation of the stone dumping vessel is completed.

However, the above-mentioned stone dumping measuring system can measure and report the stone dumping result, but since the measuring system is directly installed on the hull of the stone dumping vessel, the stone dumping measuring system measuring system may be interfered by the six-dimensional motion of the hull. As a result, the measuring result of the stone dumping measuring system is not accurate, and the measurement accuracy is not good. If the user wants to correct the measurement accuracy, it is necessary to invest a high-cost sensing apparatus and computing software to make the stone dumping measuring system more complicated and costly. Accordingly, the inventor of the present invention has devoted himself based on his many years of practical experiences to solve these problems.

SUMMARY OF THE INVENTION

The primary object of the present invention is to provide a stone dumping real time measuring system for a stone dumping vessel, which is able to measure and report the stone dumping result instantly and has the advantage of accurate and precise measurement.

In order to achieve the aforesaid object, the stone dumping real time measuring system of the present invention is applied to a stone dumping vessel. The stone dumping vessel has a hull, a control cabin at a central portion of the hull, and a fallpipe located on the hull close to the control cabin. The mouth of the fallpipe is aligned with a predetermined stone dumping position when in use. The stone dumping real time measuring system is mounted to the control cabin and comprises a boom, a signal line, and a floater. The boom is mounted to the control cabin. The boom extends outwardly from the control cabin to be located above the predetermined stone dumping position. The signal line is connected to a free end of the boom. The floater is connected to the signal line and freely floats on the water. The floater is provided with a positioning device, a surge compensator, and a depth sounder. The depth sounder is capable of delivering a measuring wave beam towards a water bottom to instantly measure and report a stone dumping result of the stone dumping vessel.

Thereby, the floater freely floats on the water through the separate design of the floater and the stone dumping vessel. The floater is directly positioned by the positioning device of the floater, and the surge compensator is able to correct a measurement error of the depth sounder to instantly report the stone dumping result and to greatly improve the accuracy and precision of the stone real time measuring system.

DETAILED DESCRIPTION OF THE PREFERRED EMBODIMENTS

Embodiments of the present invention will now be described, by way of example only, with reference to the accompanying drawings.

Figure 1:
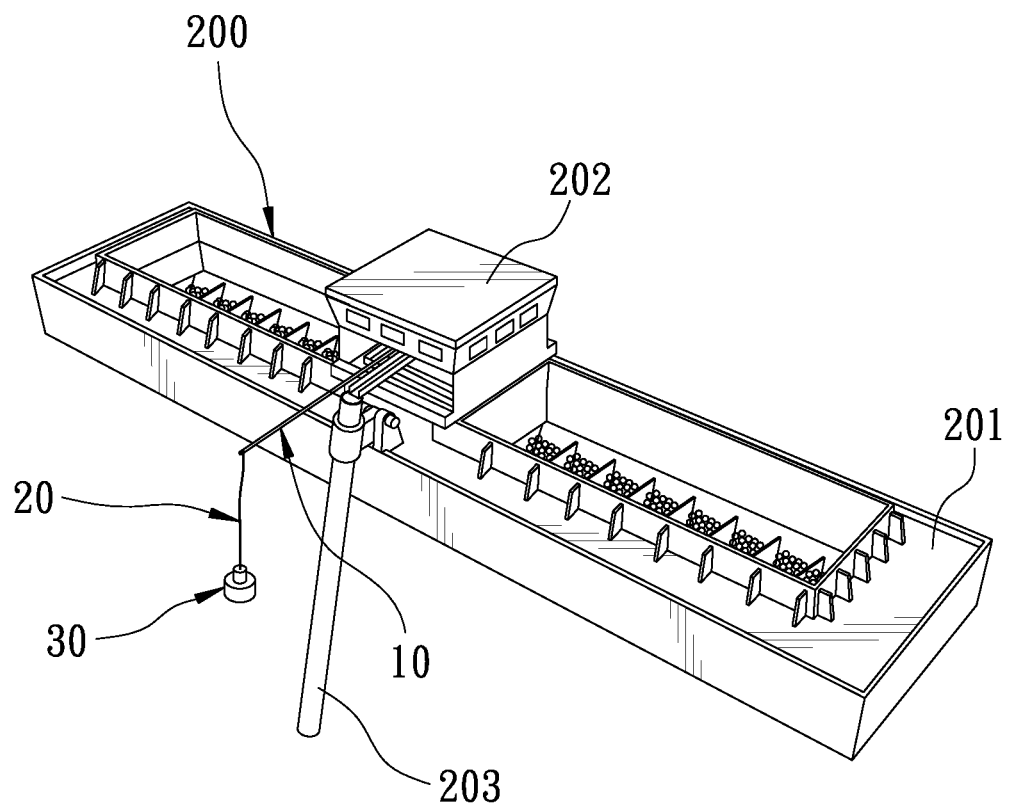
FIG. 1 is a perspective view of the present invention mounted to a stone dumping vessel.
Figure 2:
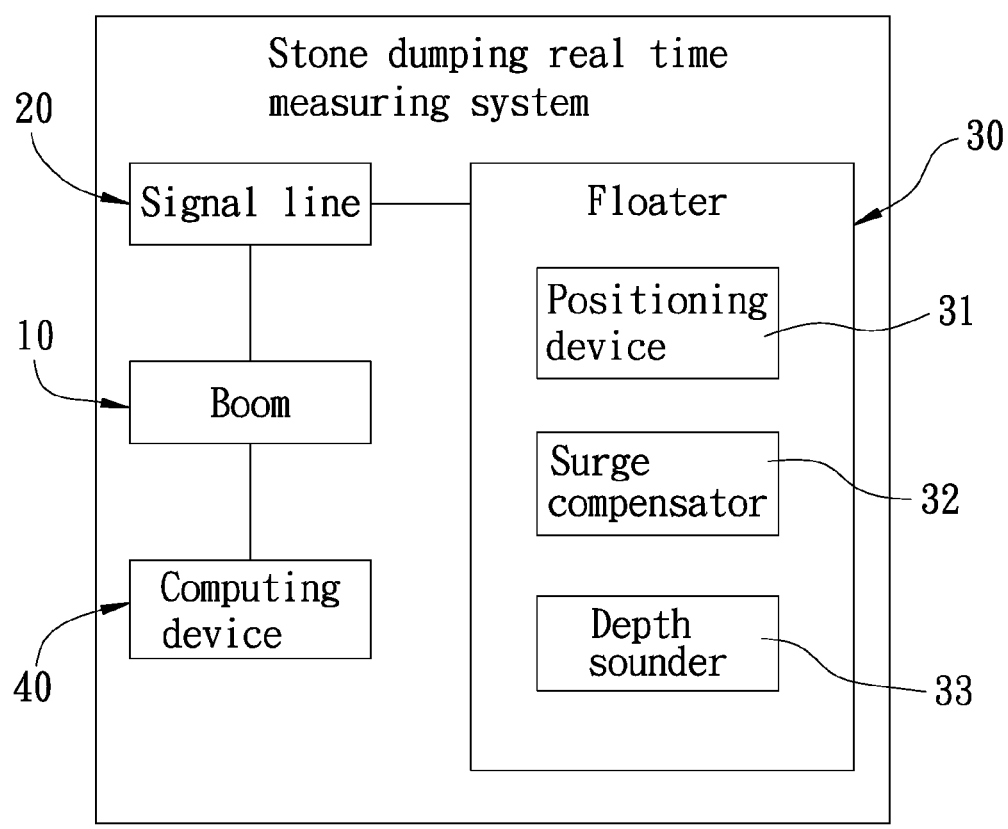
FIG. 2 is a block diagram of a stone dumping real time measuring system of the present invention.

FIG. 1 is a perspective view of the present invention mounted to a stone dumping vessel. FIG. 2 is a block diagram of a stone dumping real time measuring system of the present invention. The present invention discloses a stone dumping real time measuring system for a stone dumping vessel. The stone dumping real time measuring system is applied to a stone dumping vessel 200. The stone dumping vessel 200 has a hull 201, a control cabin 202 at the center of the hull 201, and a fallpipe 203 located on the hull 201 close to the control cabin 202. The mouth of the fallpipe 203 is aligned with a predetermined stone dumping position when in use. The stone dumping real time measuring system is mounted to the control cabin 202, and comprises a boom 10, a signal line 20, a floater 30, and a computing device 40.

The boom 10 is mounted to the control cabin 202. The boom 10 may extend outwardly from the control cabin 202 to be located above the predetermined stone dumping position.

The signal line 20 is connected to a free end of the boom 10.

Figure 3:
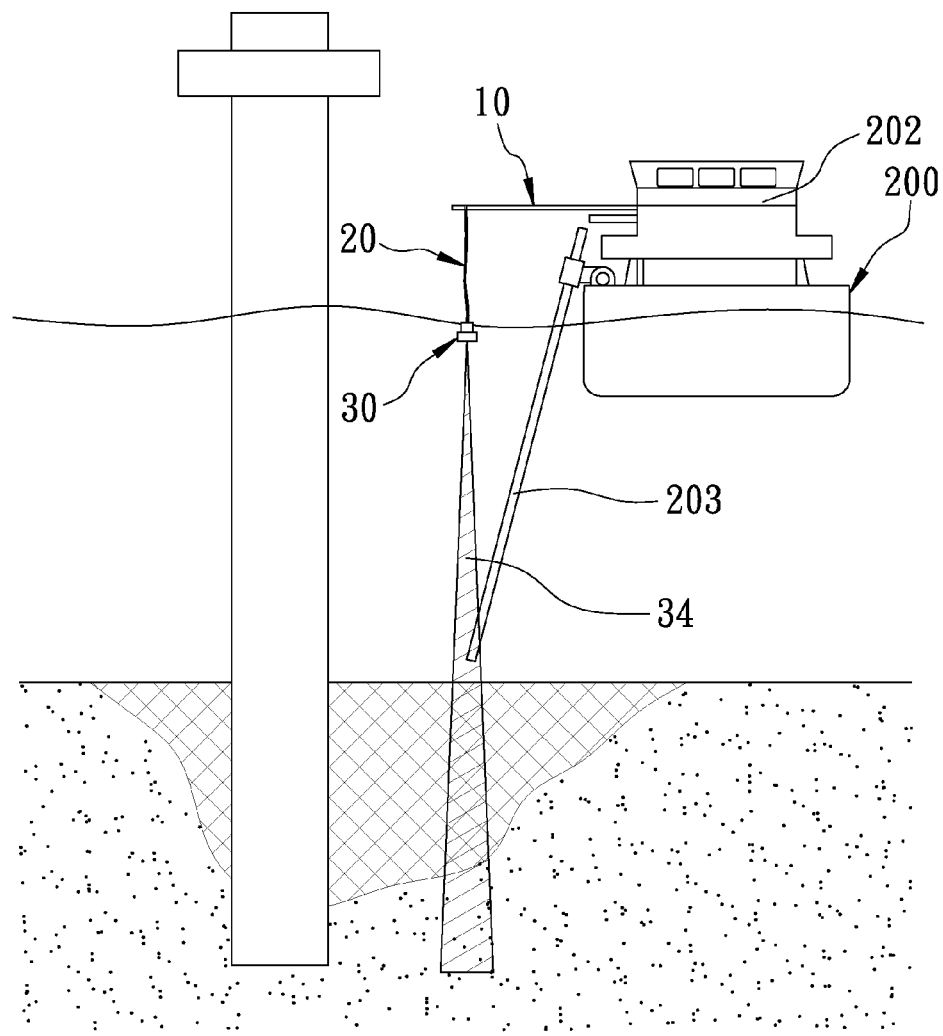
FIG. 3 is a schematic view of the present invention when in use.

The floater 30 is connected to the signal line 20 and freely floats on the water. The floater 30 is provided with a positioning device 31, a surge compensator 32, and a depth sounder 33. The depth sounder 33 is capable of delivering a measuring wave beam 34 towards the water bottom, as shown in FIG. 3, to instantly measure and report the stone dumping result of the stone dumping vessel 200. In the present invention, the positioning device 31 is an RTK-GPS system, which can accurately position the floater 30. The surge compensator 32 is adapted for measuring a water surface instantaneous variation, and its measurement accuracy is up to 5 cm RMS. The surge compensator 32 is able to correct the measurement error of the depth sounder 33. The measuring wave beam 34 of the depth sounder 33 is an acoustic wave.

The computing device 40 is disposed in the control cabin 202. The computing device 40 is adapted to combine the data obtained from the operation of the positioning device 31 and the depth sounder 33 and calculate the measurement data and display the stone dumping result by means of 3D modeling technique.

Referring to FIG. 1 in cooperation with FIG. 1 and FIG. 2, when the stone dumping vessel stops the operation of stone dumping, the boom 10 extends outwardly from the control cabin 202 to be located above the predetermined stone dumping position. The signal line 20 and the floater 30 are suspended from the boom 10. The floater 30 is free to float on the water. The depth sounder 33 of the floater 30 delivers the measuring wave beam 34 towards the water bottom at the predetermined stone dumping position. The floater 30 is positioned by the positioning device 31. The surge compensator 32 measures the water surface instantaneous variation to correct the measurement error caused by the surge when the depth sounder 33 measures. Finally the data obtained from the operation of the positioning device 31 and the depth sounder 33 are combined, and the measurement data is calculated by the computing device 40 and displayed by means of 3D modeling technique so that the user can instantly review the stone dumping result.

Figure 4:
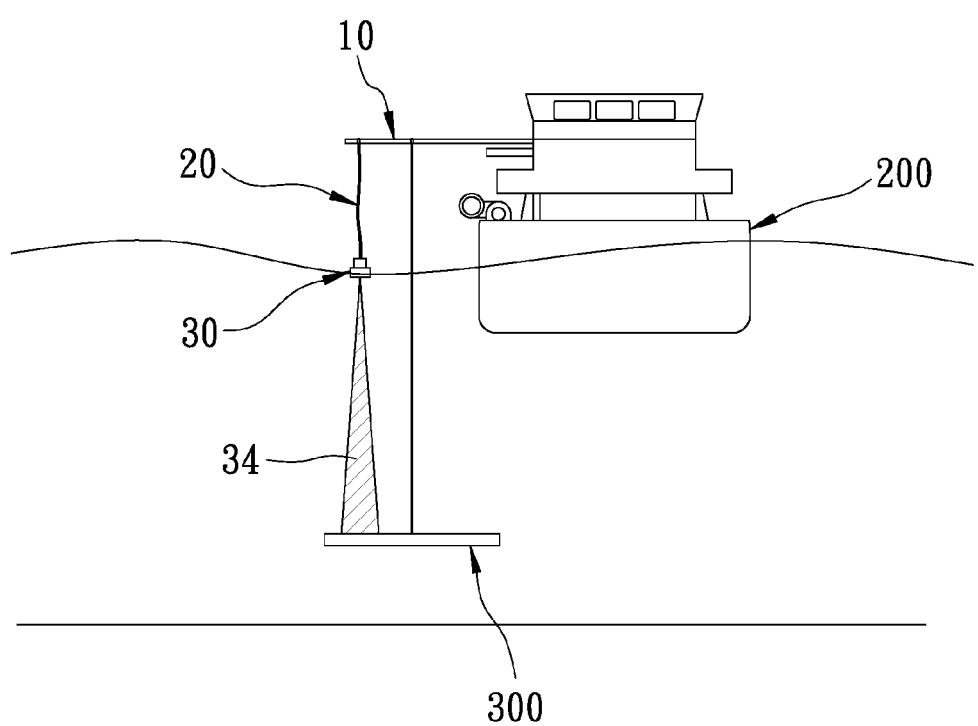
FIG. 4 is a schematic view of calibrating the depth sounder of the present invention.

FIG. 4 is a schematic view of calibrating the depth sounder of the present invention. The depth sounder 33 of the present invention is calibrated by a water depth correction plate 300. The water depth correction plate 300 is placed in the water at a fixed depth and the acoustic velocity of the depth sounder 33 is adjusted so that the reading of the depth sounder 33 is equal to the depth of placement of the water depth correction plate 300 to check whether the depth difference is within a reasonable range of instrument accuracy.

It is worth mentioning that because the stone dumping operation will stimulate the silt at the water bottom to cause local seawater turbidity, the optical detection method cannot be implemented. The measuring wave beam 34 of the present invention is an acoustic wave. Although the acoustic wave may be somewhat affected by seawater turbidity, it can be corrected to eliminate a false signal and get the exact value.

Thereby, the floater 30 can freely float on the water through the separate design of the floater 30 and the stone dumping vessel 200, so that the floater is not disturbed by the six-dimensional motion of the stone dumping vessel 200. The floater 30 is directly positioned by the positioning device 40 of the floater 30, and the surge compensator is able to correct the measurement error of the depth sounder to instantly display the stone dumping result by a 3D mode. This greatly improves the accuracy and precision of the stone real time measuring system.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A stone dumping real time measuring system for a stone dumping vessel, the stone dumping real time measuring system being applied to a stone dumping vessel, the stone dumping vessel having a hull, a control cabin at a central portion of the hull, and a fallpipe located on the hull close to the control cabin, a mouth of the fallpipe being aligned with a predetermined stone dumping position when in use, the stone dumping real time measuring system being mounted to the control cabin and comprising a boom, a signal line, and a floater;

the boom being mounted to the control cabin, the boom extending outwardly from the control cabin to be located above the predetermined stone dumping position;

the signal line being connected to a free end of the boom;

the floater being connected to the signal line and freely floating on the water, the floater being provided with a positioning device, a surge compensator, and a depth sounder, the depth sounder being capable of delivering a measuring wave beam towards a water bottom to instantly measure and report a stone dumping result of the stone dumping vessel;

thereby, the floater freely floating on the water through the separate design of the floater and the stone dumping vessel, the floater being directly positioned by the positioning device of the floater, the surge compensator being able to correct a measurement error of the depth sounder to instantly report the stone dumping result.

2. The stone dumping real time measuring system for a stone dumping vessel as claimed in claim 1, further comprising a computing device disposed in the control cabin, the computing device being adapted to combine data obtained from the positioning device and the depth sounder and calculate measurement data and display the stone dumping result by means of 3D modeling technique.

3. The stone dumping real time measuring system for a stone dumping vessel as claimed in claim 1, wherein the positioning device is an RTK-GPS system which is able to position the floater accurately.

4. The stone dumping real time measuring system for a stone dumping vessel as claimed in claim 1, wherein the measuring wave beam of the depth sounder is an acoustic wave.

5. The stone dumping real time measuring system for a stone dumping vessel as claimed in claim 1, wherein the surge compensator is adapted for measuring a water surface instantaneous variation, and its measurement accuracy is up to 5 cm RMS.

* * * * *